April 20, 1943. E. M. SPLAINE 2,316,817
OPHTHALMIC MOUNTING
Filed Oct. 21, 1939
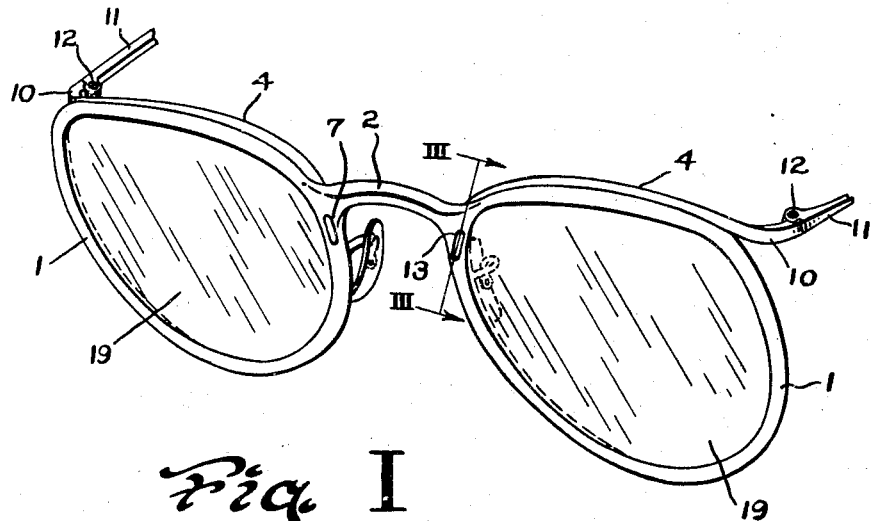
Fig. I
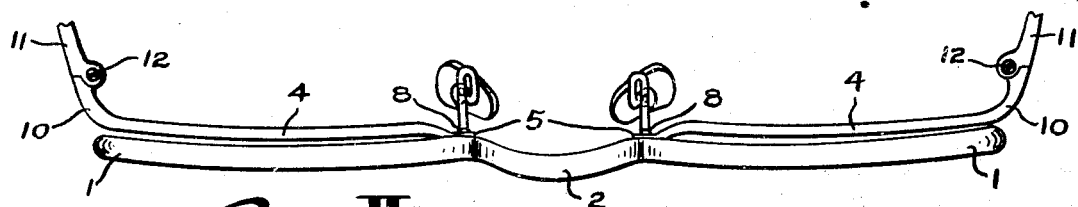
Fig. II
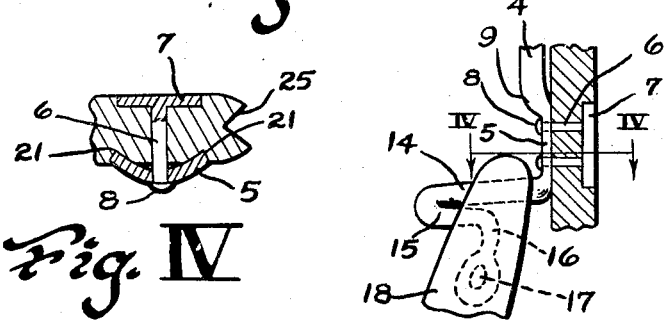
Fig. IV
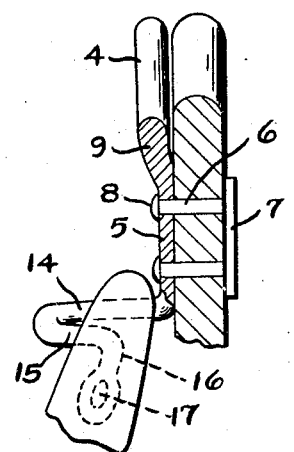
Fig. III
Fig. V
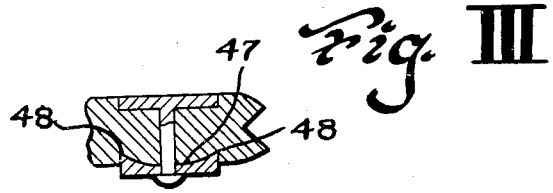
Fig. VI
INVENTOR
EDWARD M. SPLAINE
BY Louis K. Gagnon
ATTORNEY Patented Apr. 20, 1943

2,316,817

UNITED STATES PATENT OFFICE 2,316,817

OPHTHALMIC MOUNTING

Edward M. Splaine, Southbridge, Mass., assignor to American Optical Company, Southbridge, Mass., a voluntary association of Massachusetts Application October 21, 1939, Serial No. 300,605

2 Claims. (Cl. 88—41)

This invention relates to improvements in ophthalmic mountings.

One of the principal objects of the invention is to provide an ophthalmic mounting having a non-metallic lens supporting structure and relatively long and slender adjustable temple supports shaped to follow the upper contour portions of said lens supporting structure.

Another object is to provide an ophthalmic mounting of the above character with a lens supporting structure in which the lenses may be snapped into holding position and which will afford adjustment of the temples to the facial characteristics of different individuals without disturbing the related positions of the lenses.

Another object is to provide a simple construction of ophthalmic mounting of the above character whereby the parts may be quickly and easily assembled with each other and adjusted to the facial characteristics of different individuals without disturbing the relation of the lenses and in which the lenses may be positioned without changing the adjusted relation of the temple supporting structure of the mounting.

Another object is to provide an ophthalmic mounting, of the above character, having its temple supports above the useful field of vision when the mounting is in position of use on the face of the wearer, that is, so that the temples lie at least above the centers of the pupils of the eyes when the mounting is on the face.

Other objects and advantages of the invention will become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact arrangement disclosed as the preferred form only has been given by way of illustration.

Referring to the drawing:

Fig. I is a perspective view of an ophthalmic mounting embodying the invention;

Fig. II is a plan view of the mounting illustrated in Fig. I;

Fig. III is an enlarged fragmentary sectional view taken as on line III—III of Fig. I;

Fig. IV is an enlarged framgentary sectional view taken as on line IV—IV of Fig. III;

Fig. V is a view generally similar to Fig. III illustrating a modified form of the invention.

Fig. VI is a fragmentary view similar to Fig. IV of a further modification of the invention.

The invention relates particularly to the provision of an ophthalmic mounting having a lens supporting structure with face engaging portions formed of non-metallic material which is light in weight and comfortable on the face and which is resistant to corrosion and tarnish and in which the lenses may be quickly and easily assembled without the necessity of having divided lens supporting rims with mechanical means for securing the lenses in said rims, and to the provision of adjustable temple supporting members which will afford a relatively wide range of adjustment without disturbing the supporting relation of the lenses and which will be relatively inconspicuous when the mounting is viewed from the front and which will avoid having undesirable protruding portions or horn-like projections at the sides of the mounting, which might be accidentally engaged by the hand when placing the mounting on the face and will also avoid danger of dislodging the mounting from the face and of having the said mounting fall and break the lenses.

Another feature of the invention is to provide a protective marginal rim about the contour edges of the lenses which will have a relatively smooth contour surface and which will support the lenses in desired fixed spaced relation with each other during the use of the mounting.

Referring more particularly to the drawing wherein like characters of reference designate like parts throughout the several views the mounting embodying the invention comprises a pair of lens rims 1 preferably formed of non-metallic material which is light in weight, non-corrosive and non-tarnishing in nature and which will permit the lenses 19 to be snapped into assembled relation therewith and which will retain its shape and afford protection for the lenses during use. The material of the lens rims is preferably a synthetic resin having the characteristics of methyl methacrylate and may be cellulose, shell or horn-like material, all of which are light in weight and have non-corrosive characteristics. The lens rims are joined by an integral bridge 2 of the same material as the lens rims. Relatively long and slender bar-like temple supports 4 are provided with ends 5 which are flattened so as to have a relatively wide side surface contact with the rear surface of the front of the mountings adjacent the bridge, as illustrated in Figs. II to V inclusive. The ends 5 of the temple supports 4 are secured in surface contact with the rear surface of the front of the mounting by rivets or the like 6 carried by a plate 7. The rivets 6 extend through the front of the mounting and through spaced openings in the end portion 5 and are headed over as illustrated at 8 to secure the said end 5 to the front. The portions 5 extend upwardly to the rearwardly deflected portions 9 which blend into the relatively long and slender bar-like portions 4 so as to space said bar-like portions 4 slightly from the lens rims 1 throughout the upper contour of said rims and are adapted to hold said bar-like portions 4 in the rear of said rims when the parts are in desired assembled and adjusted relation with each other. The relatively long and slender bar-like temple supports 4 terminate in rearwardly extending temple attaching ends 10 to which the temples 11 are pivotally attached as illustrated at 12. The ends 10 extend rearwardly from a point adjacent the upper outer contour edges of the lens rims and are preferably located above the useful field of vision when the mounting is in desired location on the face, that is, the said temple supports are adapted to lie at least above the centers of the pupils of the eyes when the mounting is in fitted relation with the face and when the eyes are in the position of normal straight ahead vision.

To provide an attachment area the front of the mounting has a widened area 13 on the nasal sides of the lens rims. The rivets or the like 6 may extend entirely through the plates 7 or may be secured to the rear surface of the plate 7 as by soldering, welding or the like, or may be formed integral therewith, as desired, so that the front surface of the plate 7 will be relatively smooth so that suitable design engravings may be applied thereto. It is to be understood that the plate 7 may be formed to any desirable contour shape. The purpose of utilizing the plates 7 and of flattening out the ends 5 is to provide relatively wide areas of contact so that the parts may be secured in rigid relation with each other without danger of having the material of the front of the mounting break down.

It is also to be understood that the plate 7 may be embedded, as illustrated in Fig. III, so that the outer face thereof is in flush relation with the outer or front surface of the lens supporting structure.

The relatively long and slender temple supports 4 extend downwardly to a flattened area 5 and then turn rearwardly, as illustrated at 14, and forwardly and downwardly, as illustrated at 15 and 16 to a pivotal connection 17 for separate nose bearing pads 18. This arrangement provides means whereby the pads may be adjusted to fit the nose of different individuals with said adjustments allowing the lenses to remain in desired spaced relation with each other and having no effect upon the adjusted relation of the temple supports. In adjusting the mounting to the facial characteristics of different individuals the relatively long and slender temple supports are first adjusted to follow the upper contour portions of the lens rims and the rearwardly extending temple supports are simultaneously positioned so as to extend rearwardly from a point located adjacent the upper temporal edges of the lenses. To fit the temples to the facial requirements of different individuals and to position the lenses in desired angular relation to the line of straight ahead vision of said individuals and rearwardly extending portions 10 adjacent the pivotal connection 12 are adjusted inwardly or outwardly, or upwardly or downwardly relative to the lens supporting rims. Care is taken that during the forming of these latter adjustments the temple supports and rearwardly extending portions 10 remain in desired adjusted relation with the lens rims.

Because of the fact that the temple supports are separate from the lens supporting rims, the said rims may be expanded under the action of heat by a suitable expanding tool commonly used in the art whereby the lenses may be snapped into the lens supporting rims 1 which upon contracting will hold the lenses therein. It is to be understood that the said lenses are provided with commonly known bevelled edges fitting within the V-shaped grooves internally of the rims. This placing of the lenses in the lens rims will not disturb the adjusted relation of the temple supports.

With the construction illustrated in Fig. III the nose bearing pads 18 may be adjusted through bending of the rearwardly and forwardly extending portions of the nose bearing pad supports. In this particular instance, the nose bearing pads may be adjusted to the facial requirements of different individuals without disturbing the adjustment of the temple supports or without altering the relation of the lenses.

Although the end 5 is described as being provided with spaced perforations for attachment with the rivets 6, it is to be understood that the said rivets may be integrally formed on said end and that the plate 7 could be provided with the spaced openings to receive the rivets, therefore enabling the ends of the rivets to be headed over. It is also apparent that instead of utilizing rivets any other suitable type of connecting means may be used, for example, a screw or solder united connecting member.

It is also to be understood that although the relatively long and slender temple supports are described as preferably being adjusted to follow the rear of the upper contour portion of the lens rims the said supports may be shaped to follow the upper contour edges of said lens rims in the plane of the lenses or may be disposed in the front of the plane of the lenses, but in all instances, it is preferable that they be shaped to the upper contour shape of the lens rims.

As shown in Fig. IV the flared portion 5 is cupped or bent so as to provide spaced longitudinal edges 21 which, when the flared portion 5 is secured to the front 13 by the rivets or the like 6, are adapted to become embedded in the material of the front so as to lock the temple support 4 against side play relative to the front during use. A V-groove 25 is formed in the lens rims of the front for receiving the bevelled edge of the lens and for holding said lens in the lens rim.

Instead of cupping or bending the various flared portions of the temple supports so as to provide spaced edges for engaging and becoming embedded in the material of the front as shown in Fig. IV, only the under surface 47 of said flared portions may be hollowed out so as to provide edge portions 48 which will become embedded in the material of the front as shown in Fig. VI. This can be accomplished by a suitable swedging, milling or grooving operation.

The various flared portions of the temple supports, set forth above, have a different cross-sectional shape than the main body portion of said supports and are flared so as to have a greater surface contact area than said main body portion. In one of the preferred constructions the main body portion has a relatively round or oval cross-sectional shape and the flared portions have a rectangular cross-sectional shape with the widest portion of the rectangle disposed so as to engage or contact the front so as to provide a relatively wide bearing surface. This is true of all of the constructions set forth herein.

It is to be understood that the material of the fronts including the lens rims and bridge is preferably non-metallic material and that the relatively long and slender temple supports are preferably formed of metal which is pliable so as to permit adjustments but are sufficiently rigid so as to retain their adjusted positions. The said relatively long and slender temple supports may also be formed of resilient material or may have portions thereof possessing one or both of the above pliable and resilient characteristics.

From the foregoing description it will be seen that simple, efficient and economical means have been provided for accomplishing all of the objects and advantages of the invention.

Having described my invention, I claim:

1. A device of the character described comprising a front composed of a pair of lens rims joined by an integral bridge member with said rims and said bridge member being formed of non-metallic material, a pair of relatively long and slender metallic temple supports having a flared portion shaped to engage a rear surface of the front adjacent the opposed sides of the bridge member and having the major portion thereof shaped substantially to the upper contour shape of the lens rims and to follow said rims in the rear thereof and having relatively long outwardly and rearwardly extending integral temple supporting portions adjacent one end thereof and having integral rearwardly extending nose pad supports adjacent their opposed ends, said nose pad supporting portions comprising a part extending rearwardly to a turn and thence forwardly and downwardly to a pivotal connection to which nose pads are pivotally attached and means extending from said flared portions into the material of the front for securing said temple supports and integral nose pad supporting portions to the front and said flared portion being cupped on the inner surface thereof and having longitudinal edge portions embedded in the material of the front.

2. In a device of the character described a pair of lenses and a front for supporting said lenses, said front being composed of a pair of lens rims joined by an integral bridge member with said rims and said bridge member being formed of non-metallic material, a pair of relatively long and slender metallic temple supports having a flared portion shaped to engage a rear surface of the front adjacent the opposed sides of the bridge member and having the major portion thereof shaped substantially to the upper contour shape of the lens rims and to follow said rims in the rear thereof and having relatively long outwardly and rearwardly extending integral temple supporting portions adjacent one end thereof and having integral rearwardly extending nose pad supports adjacent their opposed ends, said nose pad supporting portions comprising a part extending rearwardly to a turn and thence forwardly and downwardly to a pivotal connection to which nose pads are pivotally attached and means extending from said flared portions into the material of the front for securing said temple supports and integral nose pad supporting portions to the front and said flared portion being cupped on the inner surface thereof and having longitudinal edge portions embedded in the material of the front.

EDWARD M. SPLAINE.